United States Patent [19]

Reuss et al.

[11] Patent Number: 5,067,869
[45] Date of Patent: Nov. 26, 1991

[54] AUTOMOBILE TRANSPORTATION APPARATUS

[76] Inventors: George F. Reuss; George D. Reuss, both of 18 Shady La., Irwin, Pa. 15642

[21] Appl. No.: 510,091

[22] Filed: Apr. 17, 1990

[51] Int. Cl.⁵ .............................................. B60P 3/07
[52] U.S. Cl. ...................................... 414/544; 414/667;
414/460; 414/542; 414/563; 414/541; 414/427;
414/255; 187/9 R
[58] Field of Search ............... 414/635, 785, 563, 539,
414/540, 541, 667, 671, 554, 556, 253, 255, 607,
634, 256, 259, 458, 459, 260, 460, 461, 552, 659,
427; 280/402; 187/9 R

[56] References Cited

U.S. PATENT DOCUMENTS

| | | | |
|---|---|---|---|
| 2,629,507 | 2/1953 | Olson | 414/255 X |
| 2,773,614 | 12/1956 | Edwards et al. | 414/256 X |
| 2,995,263 | 8/1961 | Fitch | 414/667 |
| 3,175,715 | 3/1965 | Smith et al. | 414/541 X |
| 3,612,484 | 12/1971 | Gallagher et al. | 414/458 X |
| 3,896,946 | 7/1975 | Forsyth et al. | 414/544 |
| 3,987,913 | 10/1976 | Lickford | 414/544 |
| 4,880,347 | 11/1989 | Lombard | 414/542 |

FOREIGN PATENT DOCUMENTS

| | | | |
|---|---|---|---|
| 2440182 | 3/1976 | Fed. Rep. of Germany | 414/542 |
| 7140 | 1/1986 | Japan | 414/541 |
| 251253 | 11/1987 | Japan | 414/563 |

OTHER PUBLICATIONS

"Mechanix Illustrated" etc. p. 89—Oct., 1952.
"Materials Handling"—p. 7—Oct. 1989.

Primary Examiner—Frank E. Werner

[57] ABSTRACT

The invention is directed to a vehicle which is used to pick up and transport and place heavy cargo. In particular, the invention relates to a vehicle which is capable of picking a vehicle from a confined space and transporting it to the appropriate location, thereby replacing a conventional tow truck.

17 Claims, 4 Drawing Sheets

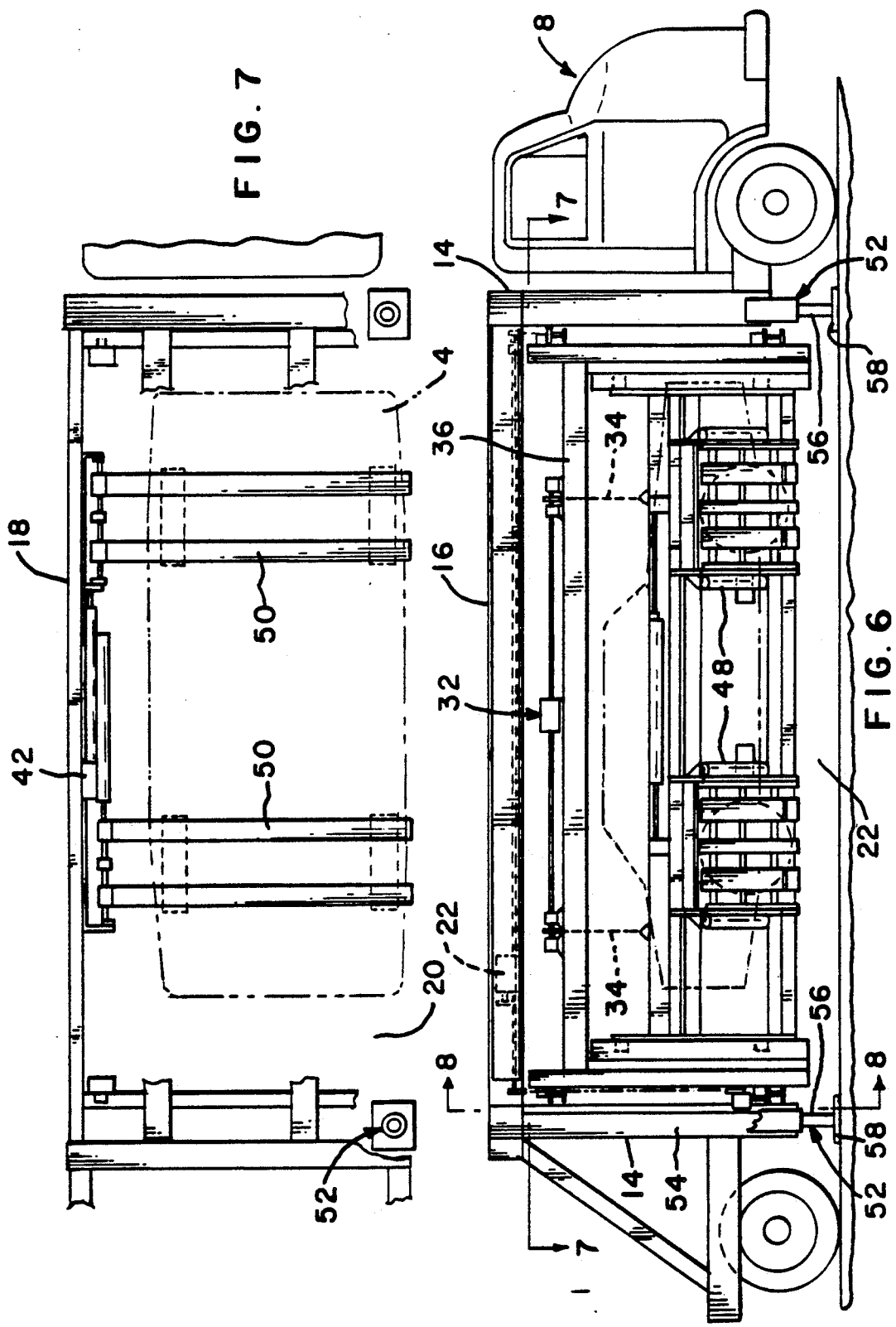

AUTOMOBILE TRANSPORTATION APPARATUS

BACKGROUND OF THE INVENTION

In many instances, it is required for cargo to be transported from one area to another. Often times, this transportation of cargo can be done with conventional equipment, as adequate space is provided to allow this equipment to function. However, as space is becoming more costly, it is essential that cargo be stored in a more economical and efficient manner. Consequently, the conventional equipment has proven inadequate to move this closely spaced cargo.

In attempt to provide a more efficient means to transport cargo, an industrial truck is described in U.S. Pat. No. 2,829,785. A mechanism is provided on the truck for picking up, raising, lowering and transporting loads and discharging the later. The invention is directed to a form of construction wherein the truck frame consists of a longitudinal side structure rigidly connected to spaced forward and rearward sections, which provide between them an opening (that is, and opening extending inwardly from that side of the frame opposite the side structure) wherein is mounted a load raising and handling mechanism. The load raising and handling mechanism includes a raisable elevation member, which supports a load carrier adapted to be positioned within the opening inwardly of the outer end thereof and operable outwardly beyond the outer end of the opening in all positions of the elevating member, whereby loading and unloading of the loads may take place at ground level or elevated levels, and when a load is picked up it may be raised to a selected level and transported and thereafter discharged at ground or elevated levels. In this form of construction the truck is adapted for carrying out loading, unloading, stacking and de-stacking operations in limited areas, such as aisles, freight cars, cargo planes and warehoused, too small or narrow for the employment of trucks having load handling mechanisms mounted at one end thereof.

Although the above-referenced patent discloses a truck for the manipulation of cargo in warehouse settings, there remains a need for a vehicle which can cooperate with automobiles and the like in the congested streets of the cities. In particular, such a vehicle is needed to remove automobiles which may be parallel street parked in an illegal manner or in such a way that would make removal difficult or impossible by conventional towing or other means.

Currently, the removal of automobiles which are parallel parked with little or no clearance front-to-back is practically impossible. Generally, a cable from a tow truck is tied to the front or rear of the auto and the auto is dragged out into the street to a point where it can then be towed in a conventional manner. Damage is imminent to both the auto to be towed and those autos surrounding it.

SUMMARY OF THE INVENTION

The invention is directed to a vehicle which is able to remove automobiles in a much more timely fashion and without applying damage as is so common with present methods.

In order to accomplish the quick and easy removal of the automobile, a vehicle for the manipulation of the automobile has a frame which has a first movable means provided thereon. The first movable means is movable relative to the frame between a first position and a second position. A first support member and a second support member are provided on the first movable means, the second support member being movable relative to the first support member between an open position and a closed position. Whereby the first member and the second member are positioned on opposed sides of a tire of an automobile when the second member is in the open position, the second member is then moved to the closed position thereby insuring that the first and second members are positioned in engagement with the tire.

In another embodiment of the invention, a vehicle for transporting an automobile has a frame which has an opening provided on a respective side thereof. The opening is dimensioned to receive the automobile therethrough. A first engagement means is provided proximate a first end of the frame, and a second engagement means is provided proximate a second end of the frame. Means are provided proximate the first and the second engagement means to manipulate the engagement means in the vertical and horizontal directions relative to the frame. The second engagement means is movable relative to the first engagement means, whereby as the first engagement means and the second engagement means are moved into cooperation with the automobile, the second engagement means is moved relative to the first engagement means to compensate for the length of the automobile.

In another embodiment of the invention, a vehicle for manipulating an automobile has a frame which has an opening provided on a respective side thereof. The opening is dimensioned to receive the automobile therethrough. Lifting means are provided on the frame, and cooperate with the automobile to move the automobile into the frame. Adjustment means are provided on the lifting means, the adjustment means enable the lifting means to be moved relative to the frame, such that the lifting means can compensate for the difference in elevation and angularity between the vehicle and the automobile.

The invention offers several advantages over the current automobile removal and transport methods. These include performing the removal operation in a much more efficient manner and minimizing the possibility of damage to the automobile. Also, the transportation of the automobile is made safer.

BRIEF DESCRIPTION OF THE DRAWINGS

FIG. 6 is a side view of the frame showing the various motors required for the movement of the various parts of the frame.

FIG. 7 is a view, taken along line 7—7 of FIG. 6, of a bottom surface of the frame, an automobile is shown in phantom.

DETAILED DESCRIPTION OF THE INVENTION

Figure 1:
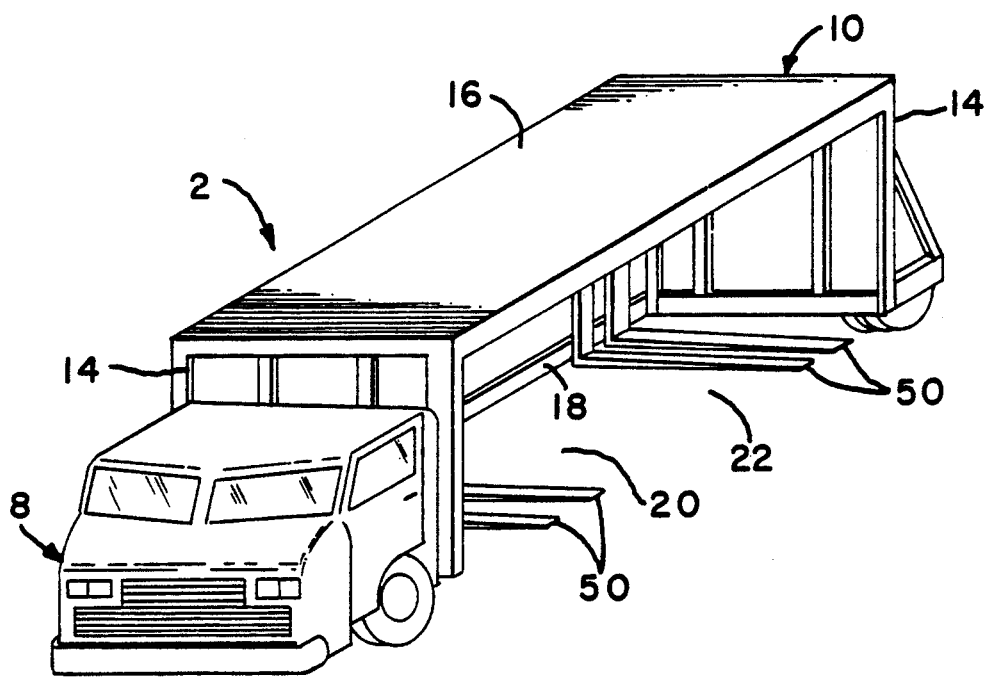
FIG. 1 is a perspective view a truck having a load manipulating frame according to the present invention.
Figure 3:
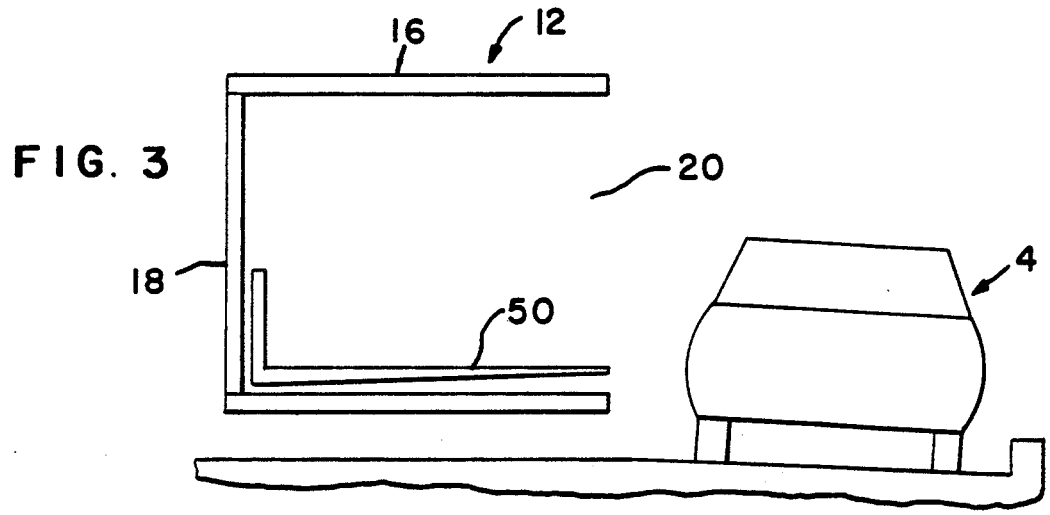
FIG. 3 is a diagrammatic view of the frame positioned in parallel, spaced relationship with an automobile.
Figure 4:
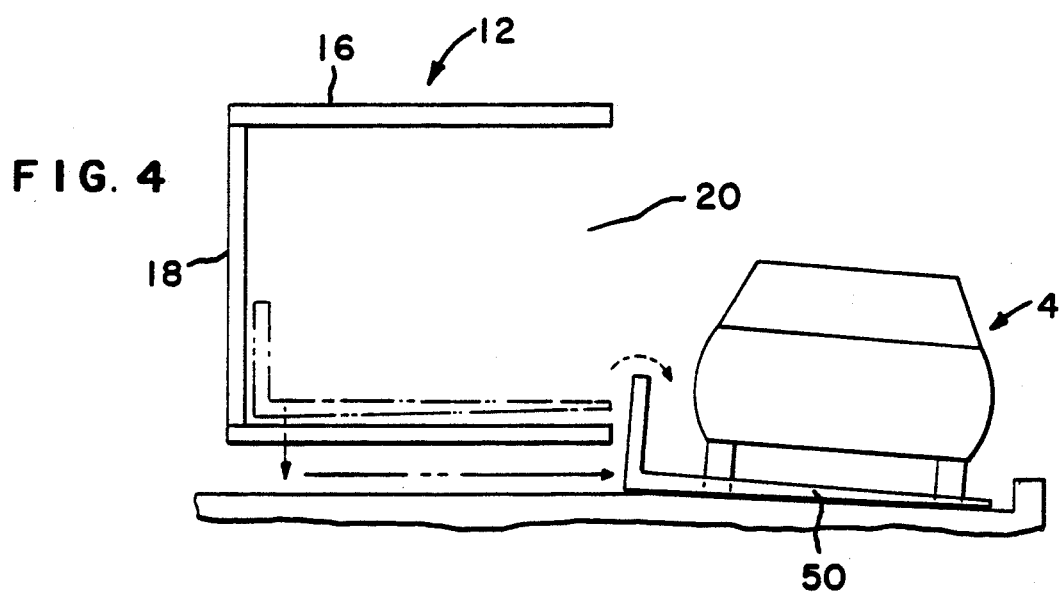
FIG. 4 is a diagrammatic view, similar to that of FIG. 3, illustrating a portion of the frame extended to cooperate with the automobile.
Figure 5:
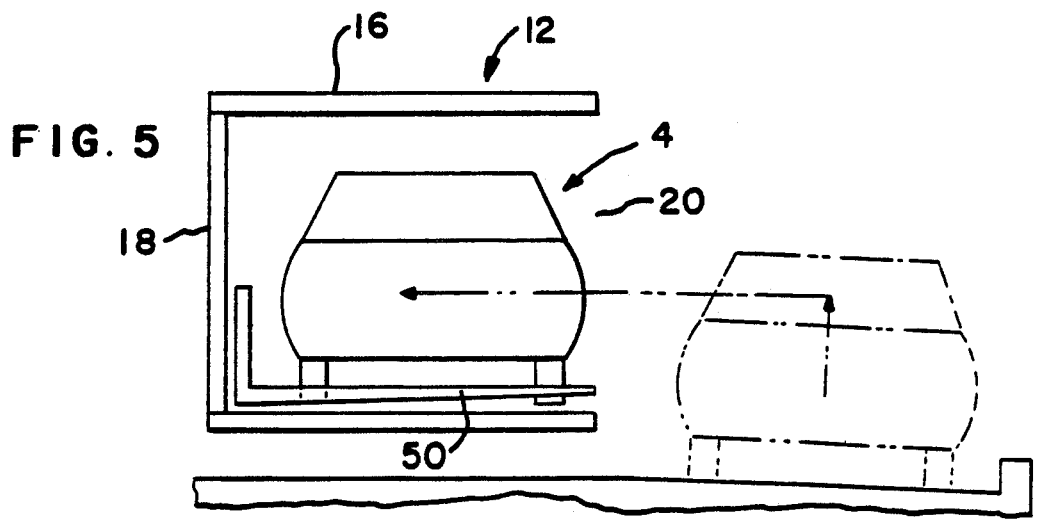
FIG. 5 is a diagrammatic view, similar to that of FIG. 4, illustrating the portion of the frame retracted, causing the automobile to be positioned within the frame.
Figure 8:
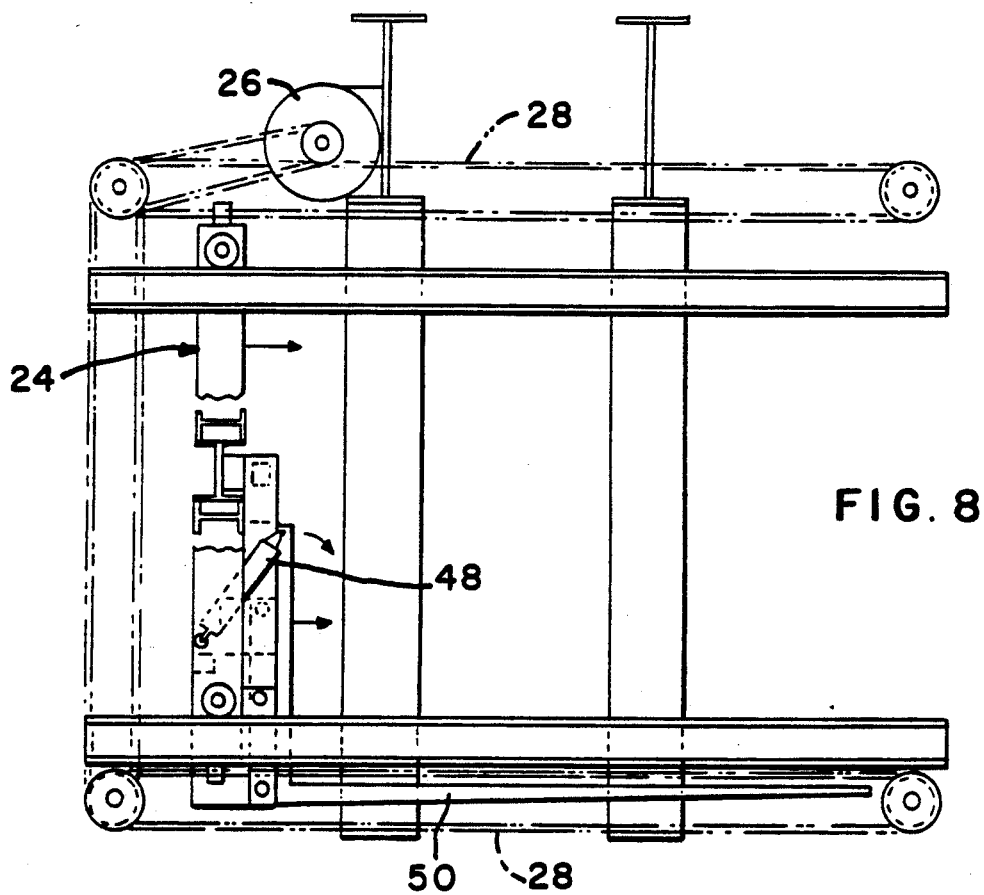
FIG. 8 is a view, taken along line 8—8 of FIG. 6, of several of the manipulation means required for the operation of the frame.

An apparatus for moving heavy loads is shown in FIG. 1. In particular, FIG. 1 illustrates a truck 2 which is used to manipulate and transport automobiles 4, as shown in FIGS. 3 through 5. Referring back to FIG. 1, truck 2 has a tractor 8 and a trailer 10.

Trailer 10 has a frame 12 which provides the structural support for the trailer. The frame 12 has closed end surfaces 14, a closed top surface 16, a closed side surface 18, an open side surface 20, and an open bottom surface 22. The open side surface 20 and open bottom surface 22 allow the automobile 4 to be inserted into the trailer 10, as will be more fully described.

Figure 2:
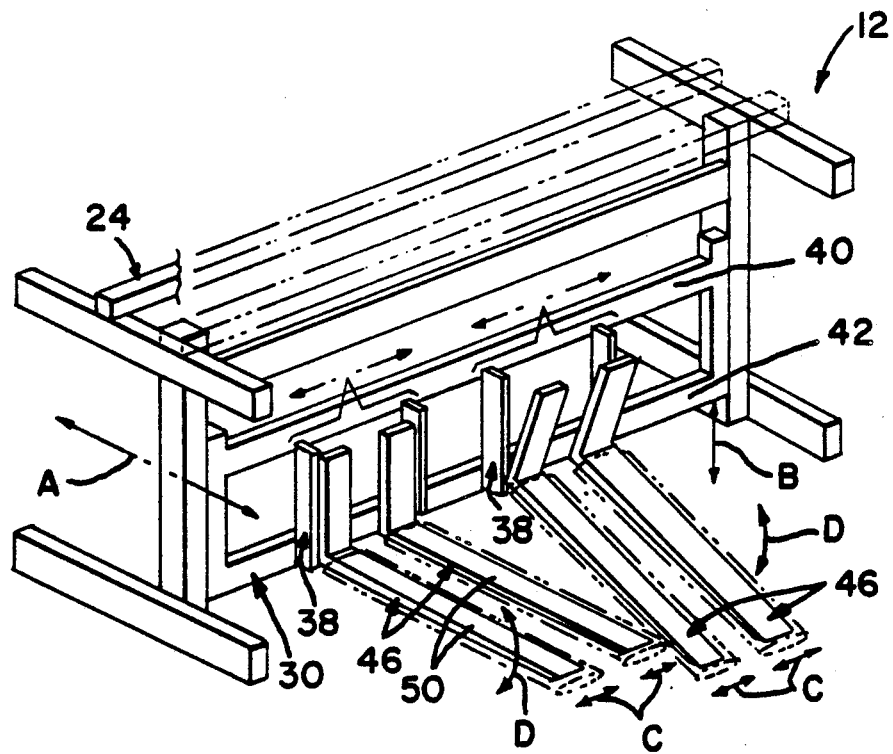
FIG. 2 is a diagrammatic view illustrating the various parts of the frame and the relative motion of each part.

Referring to FIG. 2, frame 12 has a positioning member 24 which is movable relative to the frame 12 in a direction which is essentially perpendicular to the longitudinal axis of the frame, as indicated by arrow A. This movement is facilitated by motor 26 which drives the positioning member toward and away from open side surface 20. Chains 28 insure that the movement of the positioning member 24 is controlled. A lifting member 30 is provided on the positioning member 24. The lifting member 30 is movable relative to the positioning member 24 in a direction which is indicated by the arrow B in FIG. 2. The lifting member 30 is driven by motor 32 and cables 34 which are provided on support beam 36 of positioning member 24 (as shown in FIG. 6). As indicated in FIG. 4, the lifting member 30 is movable below open bottom surface 22.

Figure 9:
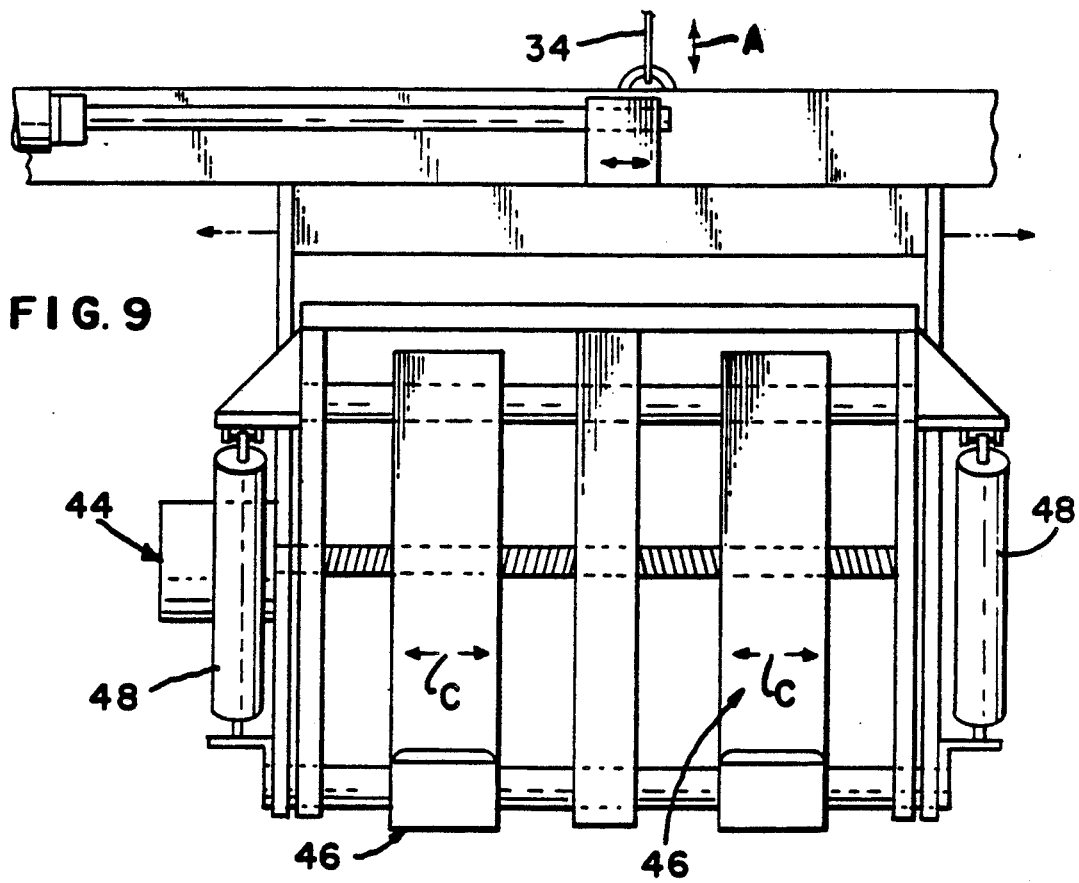
FIG. 9 is a an enlarged view of a wheel adjustment section of the frame.

Wheel adjustment members 38 are provided on lifting member 30. As shown in FIG. 2, the wheel adjustment members 38 extend from an upper bar 40 of lifting member 30 to a lower bar 42. As indicated by arrows C of FIG. 2, wheel adjustment members 38 are movable relative to the frame 12 in a direction which is essentially parallel to the longitudinal axis of the trailer. A motor 44 (FIG. 9) is provided to move the adjustment members between an open and a closed position.

Tilt members 46 extend from adjustment members 38. Hydraulic cylinders 48 are provided on adjustment members 38, to provide the means to move the tilt members 46 in the direction indicated by arrows D of FIG. 2. Each tilt member 46 has an L-shaped configuration, with the long portion 50 being movable beyond the open side surface 20 of the frame 12 and below the open bottom surface 22.

Stabilization members 52 extend from frame 12, as best shown in FIGS. 6 and 7. The stabilization members 52 are provided in a hollow bar 54 of the frame, as shown in FIG. 6. A support bar 56 extends into the bar 54, such that the support bar 56 is movable between a first position and a second position. A flat plate 58 is positioned at an end of the bar 56. The stabilization members 52 extend from end surfaces 14 proximate open side surface 20 and open bottom surface 22.

In operation, the truck 2 is moved onto position parallel to the automobile 4, as is illustrated in FIG. 3. In this position, the lifting member 30 is moved downward, until portions 50 of the tilt members 46 are provided proximate the surface on which the automobile is parked. The portions 50 are also provided in approximate parallel relationship to the ground surface.

With the lifting members 30 moved in the downward position (in which the portions 50 are below the bottom surface 22 of the trailer), the positioning member 24 is engaged. This causes the positioning member 24 to move in the direction indicated by arrow A in FIG. 2. As the positioning member 24 is moved, the attached portions 50 are moved accordingly. Consequently, as the positioning member is moved from its initial position proximate the closed side surface 18 to the intermediate position proximate open side surface 20, the portions 50 are moved beneath the automobile 4, as shown in FIG. 4.

It is important to note that the portions 50 must be spaced apart a sufficient distance to allow the portions 50 to be positioned under the automobile without damaging the wheels. Therefore, in some instances, it may be required to engage motor 44 to move the wheel engagement members 38 to the proper position before the positioning member is moved toward the open side surface 20, thereby insuring that the portions 50 will not engage the wheels prematurely.

As indicated in FIG. 4, if the ground is uneven, the tilt members 46 are moved as indicated by the arrow in the figure. Although the tilt members 46 are rotated in a clockwise direction in FIG. 4, the hydraulic cylinders which drive the tilt members are capable of manipulating the tilt members 46 in the counter clockwise direction. The tilt members are manipulated until portions 50 are essentially parallel to the underside of the automobile 4.

With the portions 50 properly positioned under the automobile 4, respective pairs of the wheel adjustment members 38 are moved toward each other. This continues until portions 50 engage the tires or wheels, thereby providing a substantial and secure support. The relative position of portions 50 are shown in FIG. 7.

With portions 50 properly positioned under the wheels of the automobile 4, the lifting member 30 is moved upward as shown by the arrow of FIG. 5. This movement causes portions 50 to move correspondingly. As the portions 50 are under the wheels, the automobile 4 is lifted from the ground. Once the automobile is lifted, and the lifting member 30 is positioned at its original height, the positioning member 24 is returned toward the closed side surface 18. This causes the automobile 4 to be moved through the open side surface 20 and into the frame 12.

As the automobile 4 is initially lifted from the ground, it may be necessary to stop the upward motion of the lifting member 30, in order to allow the tilt members 46 to return the portions 50 to a position which is essentially parallel to the top surface 16 of the frame. This insures that the automobile will remain in position on the portions 50.

When the automobile is properly positioned in the frame 12 of the trailer 10, the truck is driven to the appropriate site. The automobile is removed from the frame by reversing the steps described above.

It is important to note that at some point prior to the automobile being lifted, the stabilization members 52 must be lowered to allow the flat plate 58 to be positioned on the ground. This provides the means to stabilize the trailer when the automobile is lifted, by allowing the forces generated by the lifting of the automobile to be transferred through the stabilization members to the ground. Consequently, the trailer will not tilt due to the moment generated as the automobile is lifted. After the automobile is properly positioned in the frame, the stabilization members 52 are retracted.

The operation of all of the moving parts is accomplished by standard hydraulic motors or the like. These motors are large enough to accommodate the large loads associated with the lifting of the automobile. Although hydraulic motors and the like are shown, other means of movement can be substituted, i.e. electric motors. As all of these means are readily available and commonly known in the industry, a detailed description of these motors will not be provided.

The operation of the trailer provides the means to remove automobiles from crowded city streets. As the automobile is not required to be moved either forward or backward, the space required for the removal of the automobile is minimized. This is of particular benefit to law enforcement officials who wish to remove illegal automobiles.

Changes in construction will occur to those skilled in the art and various apparently different modifications and embodiments may be made without departing from the scope of the invention. As one illustration, inflatable air cushions (not shown) may be provided on the portions 50. These air cushions are inflated when the portions 50 are positioned under the automobile. The inflation of the air cushions causes the automobile to be supported uniformly along the portions 50. This type of feature can be useful to prevent damage to the automobile. The matter set forth in the foregoing description and accompanying drawings is offered by way of illustration only.

We claim:

1. A handling and transportation apparatus for lifting an automobile comprising:
    a frame enclosure having an open side and an open bottom;
    motor means provided on the frame enclosure;
    a first movable means, the first movable means being movable by said motor means relative to the frame enclosure between a first position and a second laterally located position, the first movable means positioned in the open bottom when the first movable means is in the first position,
    the first movable means having a first support member and a second support member, the second support member being movable relative to the first support member between an open position and a closed position;
    whereby the first member and the second member are positioned on opposed sides of a tire of an automobile when the second member is in the open position, the second member is then moved to the closed position thereby insuring that the first and second members are positioned in engagement with the tire.

2. An apparatus as recited in claim 1 wherein a second movable means is provided, the second movable means being movable relative to the frame enclosure between a first position and a second position, the second movable number being movable relative to the first movable number.

3. An apparatus as recited in claim 2 wherein the second movable means has a third support member and a fourth support member provided thereon, the third support member and the fourth support member being movable relative to the first and second support members, whereby the third and fourth support members can be moved to insure that the first and second movable means and the third and fourth movable means are properly aligned with respective tires of the automobile.

4. An apparatus as recited in claim 1 wherein the first movable means has tilt means which cooperate therewith, the tilt means allow the first and second support members to move at an angle relative to the frame enclosure such that the first and second support members can compensate for differences in elevation and angularity between the apparatus and the automobile.

5. An apparatus as recited in claim 1 wherein a track is provided on the frame enclosure, the track cooperates with the first movable means to allow the first movable means to be moved from the first position, in which the first and second support members are provided in the frame enclosure, to the second position, in which the first and second support members are provided laterally outside of the frame enclosure.

6. An apparatus as recited in claim 5 wherein the first movable means is movable in a vertical direction relative to the frame enclosure, whereby as the first movable means is moved in the vertical direction, the first and second support members may be moved accordingly.

7. An apparatus as recited in claim 1 wherein the frame enclosure is a trailer which is moved by a prime mover attached thereto.

8. A vehicle for the manipulation of a load, the vehicle having a frame enclosure which has an open side wall and an open bottom wall the open side wall and bottom wall dimensioned to receive the load therethrough, the vehicle comprising:
    motor means provided on the frame enclosure;
    a first engagement means provided proximate a first end of the frame enclosure;
    a second engagement means provided proximate a second end of the frame enclosure, the second engagement means is movable relative to the first engagement means;
    the first engagement means and the second engagement means are movable by said motor means relative to the frame enclosure between a first position and a second laterally located position, the first engagement means and second engagement means defining the bottom wall when the engagement means are in the first position;
    means provided proximate the first and the second engagement means to manipulate the engagement means in vertical and horizontal directions relative to the enclosure frame,
    whereby as the first engagement means and the second engagement means are moved into cooperation with the automobile, the second engagement means is moved relative to the first engagement means to compensate for the length of the automobile.

9. A vehicle as recited in claim 8 wherein the first and the second engagement means have inflatable cushions provided thereon, whereby the first and the second engagement means are positioned under the load and the inflatable cushions are inflated, causing the load to be supported.

10. A vehicle as recited in claim 8 wherein the first and the second engagement means have lifting forks provided thereon.

11. A vehicle as recited in claim 10 wherein the frame has members provided proximate the open side wall of the frame enclosure, the jack members are actuated when the load is lifted, thereby insuring that the vehicle will remain stable as the load is supported.

12. A vehicle is recited in claim 8 wherein the first and the second engagement means have tilt means which cooperate therewith, the tilt means allow the first and second engagement means to move at an angle relative to the frame enclosure such that the first and second engagement means can compensate for differences in elevation and angularity between the vehicle and the automobile.

13. A vehicle for manipulating an automobile, the vehicle having a frame enclosure which has an open side wall and an open bottom wall, the open side wall and bottom wall dimensioned to receive the automobile therethrough, the vehicle comprising:
   motor means provided on the frame enclosure;
   lifting means which cooperate with the automobile to move the automobile into the frame enclosure;
   the first engagement means and the second engagement means are movable by said motor means relative to the frame enclosure between a first position and a second laterally located position, the first engagement means and second engagement means defining the bottom wall when the engagement means are in the first position;
   adjustment means provided on the lifting means, the adjustment means enable the lifting means to be moved relative to the frame enclosure, such that the lifting means can compensate for the difference in elevation and angularity between the vehicle and the automobile.

14. A vehicle as recited in claim 13 wherein the frame enclosure jack members provided proximate the open side wall of the frame enclosure, the jack members are actuated when an automobile is lifted, thereby insuring that the vehicle will remain stable as the automobile is lifted.

15. A vehicle as recited in claim 13 wherein the lifting means has a first engagement means and a second engagement means, the second engagement means is moveable relative to the first engagement means.

16. A vehicle as recited in claim 15 wherein the first and the second engagement means have lifting forks provided thereon.

17. A vehicle as recited in claim 16 wherein the lifting forks have means provided proximate thereto to manipulate the lifting forks in a vertical and horizontal direction relative to the frame enclosure.

* * * * *